Sept. 22, 1959 B. D. LOUGHLIN 2,905,752

AUTOMATIC INDEX LEVEL CONTROL CIRCUIT

Filed Dec. 14, 1955 2 Sheets-Sheet 1

Sept. 22, 1959 B. D. LOUGHLIN 2,905,752

AUTOMATIC INDEX LEVEL CONTROL CIRCUIT

Filed Dec. 14, 1955 2 Sheets-Sheet 2

United States Patent Office 2,905,752
Patented Sept. 22, 1959

2,905,752

AUTOMATIC INDEX LEVEL CONTROL CIRCUIT

Bernard D. Loughlin, Lynbrook, N.Y., assignor to Hazeltine Research, Inc., Chicago, Ill., a corporation of Illinois Application December 14, 1955, Serial No. 553,139

5 Claims. (Cl. 178—5.4)

This invention relates to color-image-reproducing apparatus for color-television receivers and, more particularly, to apparatus of the type which employs a cathode-ray image reproducer in which a cathode-ray beam sequentially scans color elements to reproduce a composite image and in which there is developed an indexing signal representative of the scanning frequency and phase of given color elements by the cathode-ray beam. For convenience, such a cathode-ray image reproducer will be referred to hereinafter as a reproducer of the beam-indexing type.

Some prior cathode-ray image reproducers of the beam-indexing type have employed cathode-ray tubes having phosphor screens comprising red, green, and blue light-emissive phosphor stripes disposed in repetitive succession normal to line scan. The color-repetition frequency of the picture signal applied to the cathode-ray tube, that is, the frequency of the color elements, is synchronized with the color element scanning frequency. For example, the red color elements may be scanned at a 7-megacycle rate, more or less. The same is true of the blue and green elements. Accordingly, the red, green, and blue color-repetition frequency of the picture signal applied to the reproducer should be 7 megacycles in synchronism with the scanning of corresponding color elements.

Due to nonuniformity of color element scanning caused, for example, by nonuniform distribution of phosphor stripes on the cathode-ray tube screen or by nonlinearities of the line scan, the color element scanning frequency and phase vary across the image raster. Accordingly, in prior reproducers of the beam-indexing type, an indexing signal has been developed at a suitable indexing electrode to synchronize the frequency and phase of the picture signal applied to the cathode-ray tube with the color element scanning frequency.

Heretofore, reproducers of the beam-indexing type have, in general, employed secondary-emissive strips for developing an indexing signal. However, some secondary emission from surfaces between the indexing strips also occurred. The secondary-emission currents from the indexing strips and the surfaces between the indexing strips varied in accordance with the color signal applied to the cathode-ray beam-intensity control circuit of the cathode-ray tube. Moreover, in order to provide a wide contrast range, a low minimum level of indexing signal was required for reliable operation. Hence, the secondary-emission effects, due to the color signal, caused appreciable color-signal interference with the indexing signal. Accordingly, to minimize color-signal interference with the indexing signal, it has been the practice to derive the indexing signal from the cathode-ray tube as a side-frequency modulation component of a carrier signal introduced into the system and having a frequency of, for example, 52 megacycles.

Moreover, because color signals have previously been applied to the cathode-ray beam-intensity control circuits and because of nonlinearities of the electron gun beam-generating characteristic, harmonic components of the color signal were generated. Since the fundamental frequency of the color signal as applied to the electron gun was, for example, 7 megacycles, the harmonic components were spaced in the frequency spectrum by 7 megacycles. Accordingly, it has been the practice to interleave the indexing-signal carrier between harmonic components of the color signal. As the frequency of the indexing signal varied, the corresponding side-frequency component of the carrier signal varied accordingly and the frequency of the color signal was caused to vary in like manner. However, the frequency variation of the generated harmonic components of the color signal was much greater than the variation of the side-frequency component representing the indexing signal because of the frequency multiplication involved in the generation of the harmonic components. Thus, it has heretofore been necessary to restrict the frequency variation of the indexing signal to a value sufficiently small that interference between the harmonic components of the color signal and the side-frequency component representing the indexing signal was tolerable. This requirement did not allow wide tolerances in the distribution of the phosphor stripes of the cathode-ray tube screen or in the linearity of line scan.

In accordance with the invention described and claimed in the copending application of B. D. Loughlin and A. V. Loughren, entitled "Color-Image-Reproducing Apparatus," Serial No. 552,443, filed December 12, 1955, interference with the indexing signal ordinarily caused by harmonics of the color signal can be substantially eliminated by imposing the color signal on the apparatus as a velocity-modulation component of the line scan. Further, interference with the indexing signal caused by the fundamental color signal may be reduced to a sufficiently small value that the indexing signal may be derived at the fundamental frequency rather than as a side-band component of a carrier signal, thereby eliminating the need for a carrier generator and associated circuits.

When employing velocity modulation of line scan to apply the color signal or other components of the video signal to the image-reproducing apparatus, the indexing-signal amplitude may fall below a desired minimum level because the velocity modulation over certain regions of the tube face will increase the scanning velocity of the cathode-ray beam as it sweeps over the indexing strip and thus will decrease the total secondary emission of the indexing strip. Additionally, the velocity modulation may cause the raster developed by the indexing-signal cathode-ray beam of apparatus having an indexing-signal gun and a picture-signal gun to assume varying colors. Such a raster of varying colors is more noticeable than the substantially white raster which would be developed if the minimum indexing-signal amplitude remained constant, that is, if the indexing-signal amplitude due to the indexing-signal beam remained constant.

It is an object of the present invention, therefore, to provide a new and improved color-image-reproducing apparatus for a color-television receiver which avoids one or more disadvantages of prior such apparatus.

It is another object of the invention to provide a new and improved color-image-reproducing apparatus employing a cathode-ray image reproducer of the beam-indexing type and employing velocity modulation for applying the color signals to the reproducer in which the indexing signal is maintained above a given minimum amplitude level.

It is another object of the invention to provide a new and improved color-image-reproducing apparatus employing a cathode-ray image reproducer of the beam-indexing type having an indexing-signal cathode-ray beam and a picture-signal beam and employing velocity modulation for applying the color signals to the reproducer in which the indexing-signal cathode-ray beam develops a substantially white raster.

In accordance with a particular form of the invention, color-image-reproducing apparatus for a color-television receiver comprises circuit means for supplying a picture signal representative of a color image to be reproduced and cathode-ray image-reproducing means having a display screen comprising color elements and including indexing means for developing an indexing signal representative of the scanning of the color elements by the cathode-ray beam. The apparatus also includes circuit means coupled to the cathode-ray image-reproducing means for effecting scanning of the color elements by the cathode-ray beam and responsive to the indexing signal for controlling the relation of the scanning of the color elements and the color repetition of the picture signal and responsive to the picture signal for varying the scanning velocity in accordance with the image to be reproduced to develop a color image. The apparatus also includes circuit means responsive to the picture signal for modulating an indexing signal component of the cathode-ray beam inversely of the scanning velocity variations to maintain the indexing signal above a given minimum amplitude level.

For a better understanding of the present invention, together with other and further objects thereof, reference is had to the following description taken in connection with the accompanying drawing, and its scope will be pointed out in the appended claims.

Referring to the drawing.

Figures 1, 2:
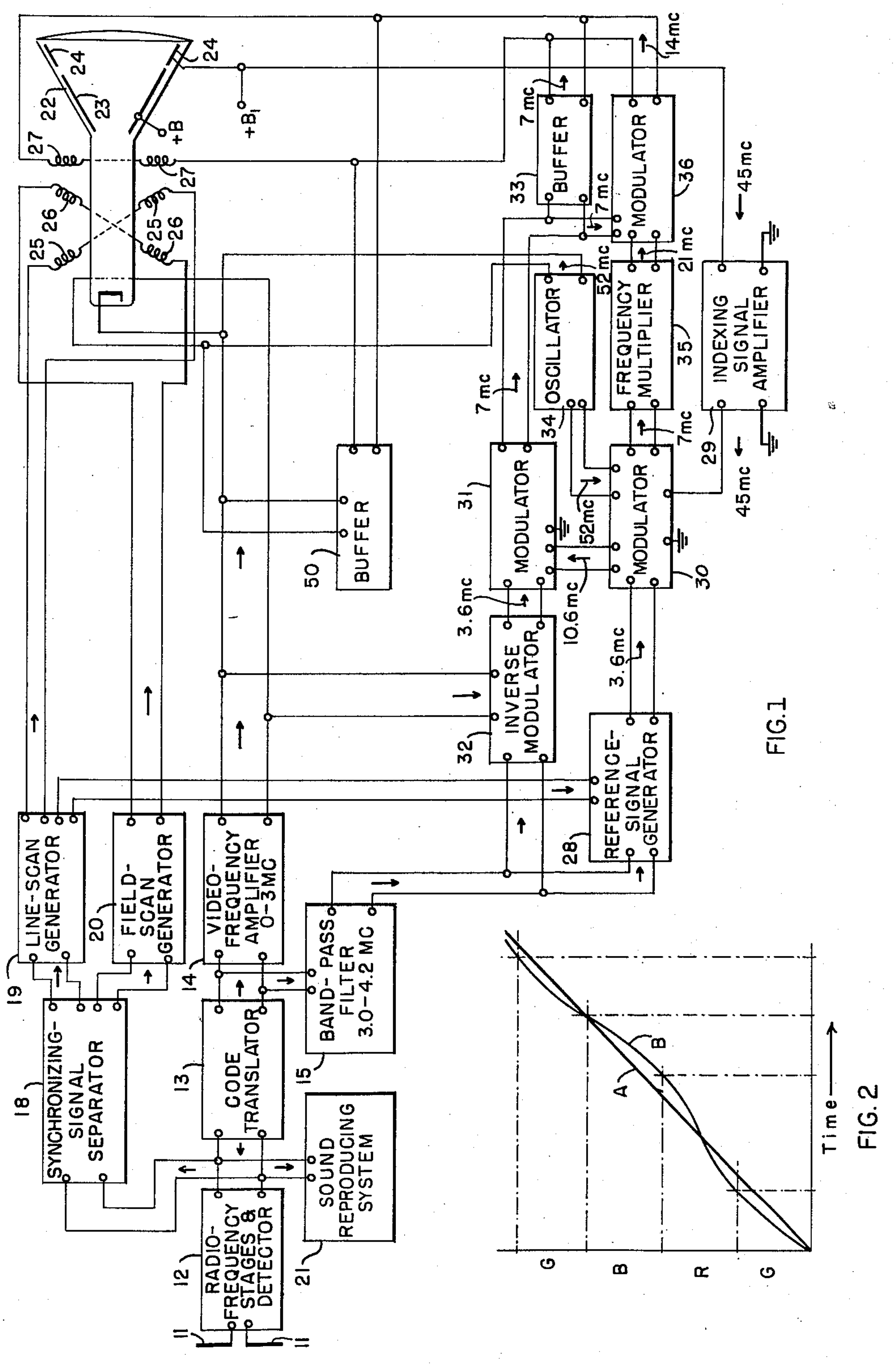
Fig. 1 is a circuit diagram, partly schematic, of a color-television receiver including color-image-reproducing apparatus constructed in accordance with the invention.
Fig. 2 is a graph to aid in explaining the operation of the Fig. 1 embodiment.

Referring now to Fig. 1 of the drawing, the receiver includes an antenna system 11, 11 of conventional construction to which the following are connected in cascade: radio-frequency stages and detector 12, also of conventional construction, for deriving video-frequency modulation components of the received television signal with chrominance components at approximately 3.6 megacycles; a code translator 13, of conventional construction, preferably of the type described in an article by B. D. Loughlin, entitled "Processing of the NTSC Color Signal for One-Gun Sequential Color Displays," Proceedings of the I.R.E., January 1954 and also known as a Y-to-M converter and subcarrier modifier for converting the video-frequency modulation components to a so-called dot-sequential signal having chrominance components at approximately 3.6 megacycles and a luminance-correction component; and a video-frequency amplifier 14 having a pass band of, for example, 0–3 megacycles for translating the corrected luminance signal to the display apparatus. The video-frequency amplifier 14 constitutes first circuit means for supplying a signal primarily representative of the luminance of a composite color image to be reproduced.

There is also provided second circuit means for supplying a signal primarily representative of the color of the image to be reproduced comprising a band-pass filter 15 having a pass band of, for example, 3.0–4.2 megacycles for translating the corrected chrominance components and the color burst signal.

The receiver also includes a suitable synchronizing-signal separator 18 for separating the line-scan and field-scan synchronizing components from the output signal of the detector of unit 12. The separator 18 applies the line-scan and field-scan synchronizing components to line-scan and field-scan generators 19 and 20, respectively, included in the scanning circuit means of the color-image-reproducing apparatus for developing an image raster.

The receiver also includes a conventional sound-reproducing system 21 coupled to the unit 12 for reproducing sound in the usual manner.

The color-image-reproducing apparatus includes cathode-ray image-reproducing means having cathode-ray beam-intensity control means coupled to the first supply circuit means and having a display screen comprising color elements and including indexing means for developing an indexing signal representative of the scanning of the color elements by the cathode-ray beam. More particularly, the cathode-ray image-reproducing means comprises a cathode-ray tube 22 of the beam-indexing type and of conventional construction. The tube preferably has two electron guns of which only the common cathode and first control electrodes are represented in the drawing. The tube also has an anode 23 connected to a suitable source of positive potential +B and an output electrode 24 for collecting the secondary electrons representing the indexing information and connected to a source $+B_1$. There are associated with the tube, line-scan windings 25, 25 and field-scan windings 26, 26 connected to the line-scan and field-scan generators 19 and 20, respectively, for effecting scanning of the color elements by the cathode-ray beam. Auxiliary line-scan windings 27, 27 are supplied for a purpose explained subsequently.

For clarity of expression, the term "indexing signal" will be employed to refer to a signal which carries information representing the scanning of the color elements of the display screen although this signal may undergo frequency conversion and also carry additional information during translation.

The apparatus also includes circuit means responsive to the picture signal and, more particularly, to the color signal for modulating the cathode-ray beam inversely of the scanning velocity variations to maintain the indexing signal above a given minimum amplitude level and to maintain a substantially white raster due to the indexing-signal cathode-ray beam. This circuit means comprises auxiliary line-scan windings 27, 27 and associated connections to a buffer 50 which is, in turn, connected to the indexing-signal gun of the cathode-ray tube 22. The windings 27, 27 and the buffer 50 are coupled to the buffer 33 and are responsive to at least the fundamental component of the picture signal and are effective to derive a signal inversely representative of the scanning velocity variations for varying the bias of the indexing-signal gun inversely of the scanning velocity variations. The windings 27, 27 derive a voltage signal representative of the derivative of the current therethrough, the current being the picture signal effective to cause displacements of the cathode-ray beam. It is well known that a derivative signal may be derived from an original signal by introducing a leading phase shift of 90° and modifying the amplitude in proportion to frequency.

There is also provided signal-generating circuit means including an oscillator 34 for supplying an indexing-signal carrier for modulating the indexing-signal cathode-ray beam at a frequency of, for example, 52 megacycles to provide a low-level indexing-signal carrier.

The color-image-reproducing apparatus preferably also includes circuit means for supplying a subcarrier reference signal synchronized with the color burst of a received composite video signal. This circuit means comprises a reference-signal generator 28 coupled to the band-pass filter 15.

The scanning circuit means of the apparatus includes, in addition to the generators 19 and 20 and the windings 25, 25, 26, 26, and 27, 27, means responsive to the indexing signal for controlling the relation of the scanning of the color elements and the color repetition of the color signal and responsive to the color signal for varying the scanning in accordance with the color of the image to be reproduced to develop a composite color image. This means preferably includes an indexing-signal amplifier 29 responsive to the indexing signal for applying the same to a modulator 30 also responsive to the subcarrier reference signal for deriving a heterodyne signal representative of the indexing signal. A modulator 31 also included in the last-mentioned means has one input circuit coupled to the modulator 30 and another input circuit coupled through an inverse modulator 32 to the band-pass filter 15 for deriving a color signal having its color-repetition frequency synchronized with the color element scanning frequency.

The inverse modulator 32 has a second input circuit coupled to the output circuit of the video-frequency amplifier 14 for deriving from the corrected chrominance and luminance signals applied thereto by the band-pass filter 15 and the amplifier 14, respectively, a signal representative of the chromaticity of the image to be reproduced. The chromaticity of the image to be reproduced is independent of the luminance. The inverse modulator 32 may be of conventional construction, for example, of the type described in Patent No. 2,851,517 issued September 9, 1958, and entitled "Color-Television Signal-Translating Apparatus" and more fully described hereinafter.

The output circuit of the modulator 31 is coupled through the buffer stage 33 of conventional construction to the windings 27, 27 for varying the scanning velocity in accordance with the color of the image to be reproduced to develop a composite color image. The apparatus preferably also includes circuit means responsive to the indexing signal and the color signal derived by the modulator 31 for deriving a second color signal having a frequency at the second harmonic of the color signal derived by the modulator 31. This circuit means includes the modulator 30, which responds to the output signal of the indexing-signal amplifier 29 and to the output signal of oscillator 34, for deriving a heterodyne signal representing the indexing signal. The output circuit of the modulator translating this heterodyne signal is coupled through a frequency multiplier 35 having a multiplication factor of for example 3, to a modulator 36 having another input circuit coupled to the modulator 31. The output signal of the modulator 36 is at the second harmonic of the color signal derived by the modulator 31, and the modulator 36 is coupled to the windings 27, 27 to vary the scanning velocity in accordance with the derived second harmonic signal.

Figure 3:
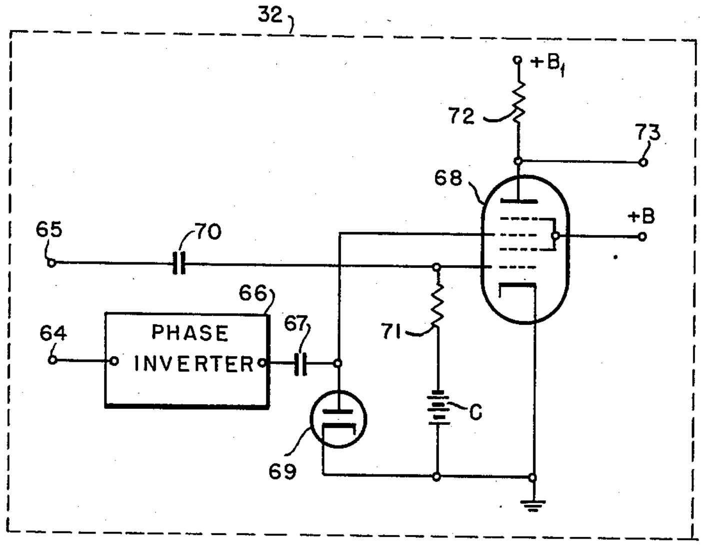
Fig. 3 is a circuit diagram of an inverse modulator utilized in the Fig. 1 apparatus.

Referrring now to Fig. 3, the inverse modulator 32 is there represented in detail. An input terminal 64 is coupled through a phase inverter 66 and a condenser 67 to a control electrode, specifically the outer signal input grid which is of the remote cutoff type, of a mixer vacuum tube 68. A clamping diode 69 has its anode connected to the remote cutoff grid and its cathode connected to the cathode of tube 68. A second input terminal 65 of the unit 32 is coupled through a condenser 70 to a control electrode of the tube 68, specifically the inner signal input grid thereof, which is provided with a grid-leak resistor 71 and a bias battery C. The anode of the tube 68 is coupled through an anode load resistor 72 to a source of potential $+B_1$ and to the output terminal 73 of the unit 32.

In a mixer tube of the type having a remote cutoff outer signal grid, such as the tube 68 of Fig. 3, the $e_g$–$i_p$ curve of the remote cutoff grid resembles the curve of a negative inverse function. That is, the $e_g$–$i_p$ curve over a given portion closely approximates a hyperbola of the type representing a function having one coordinate varying as the negative reciprocal of the other. Therefore, if a signal is applied to the remote cutoff grid, there will be developed in the anode current a negative inverse of the applied signal. Since a conventional modulator normally produces an output current flow proportional to the product of the applied signals, if a negative signal is applied to the remote cutoff grid by the phase inverter 66, the operation of the tube 68 is such that the resultant current flow through the load resistor 72 represents the division of the signal applied to the terminal 65 by the signal applied to the terminal 64.

Considering now the operation of the color-image-reproducing apparatus, the cathode-ray beam (including the indexing-signal beam) of the tube 22 during each line scan sequentially scans the color elements or stripes of the cathode-ray tube and develops at the indexing electrode 24 an indexing signal representative of the scanning of stripes of a given color. Due to nonuniformity of color element scanning caused, for example, by nonuniform distribution of phosphor stripes on the cathode-ray tube screen or by non-linearities of line scan, the color element scanning frequency and phase vary across the image raster. This scanning frequency may, for example, be approximately 7 megacycles for systems operating with United States standards and, ordinarily, varies across each line as the line is scanned with, at most, a slight variation at field-scan frequency.

Because of oscillator 34, which supplies a carrier signal for the indexing signal, the indexing signal developed at the output electrode 24 of the tube 22 may have a varying frequency of, for example, approximately 45 megacycles corresponding to a side frequency of the carrier signal. This indexing signal is amplified by the amplifier 29 and applied to modulator 30 wherein it beats with the output signal of the oscillator 34 having a frequency of, for example, 52 megacycles and with the reference signal from unit 28 having a frequency of approximately 3.6 megacycles to develop a heterodyne signal having a frequency of, for example, 10.6 megacycles.

The heterodyne output signal of the modulator 30 is applied to the modulator 31 while the picture signals and, in particular, the corrected color components translated by the band-pass filter 15 are applied to another input circuit of the modulator 31 after conversion to chromaticity components in the inverse modulator 32 in response to the application of the corrected luminance signal to the modulator 32 by the amplifier 14. The signals applied to the modulator 31 beat together in the modulator to develop output color signals having a frequency of approximately 7 megacycles for application to the auxiliary windings 27, 27 via the buffer amplifier 33.

The phase and amplitude of the color signals applied to the windings 27, 27 are effective to control the colors reproduced by the tube 22 by controlling the velocity of the cathode-ray beam as it scans the individual stripes of the cathode-ray tube. As the velocity of scanning a given set of stripes, for example, the red stripes, is increased, less red is apparent in the reproduced image. Likewise, as the velocity of scanning the red stripes is decreased, more red is apparent in the reproduced image. In this manner, the scanning velocity varies in accordance with the applied color signal to reproduce the composite image.

The variation of scanning velocity with the applied color signal is represented in Fig. 2 which is a graph representing the time-space characteristic of a line scan. Curve A represents a horizontal line scan with no applied color signal and thus no velocity modulation. Curve B represents a line scan with velocity modulation which increases the red-light output and decreases the green-light and blue-light outputs by increasing the beam dwell time on the red stripes and decreasing the beam dwell time on the green and blue stripes.

It will be understood that the static phase may be controlled during initial adjustment by, for example, adjustment of the phase of the output signal of the generator 28 while the amplitude may be controlled conveniently by any conventional gain adjustment of the color-signal-translating channel.

While the application of the fundamental component of the color signal to the cathode-ray tube 22 reproduces a color image in accordance with the applied color signal, the color signal at the fundamental frequency of 7 megacycles represents only an approximation of the ideal scanning signal which would reproduce the picture perfectly. For example, highly saturated colors will not be perfectly reproduced. The picture quality may, therefore, be improved by supplying one or more additional harmonics of the color signal in proper phase and amplitude so that the ideal scanning signal is more closely approximated. Accordingly, a second harmonic of the color signal is supplied in the following manner.

The modulator 30 has one output circuit tuned to 7 megacycles to derive an indexing signal at 7 megacycles with frequency variations in response to the output signals of the amplifier 29 and the oscillator 34. This 7-megacycle signal is supplied to the multiplier 35 wherein it is multiplied by a factor of 3 to provide a 21-megacycle signal for application to the modulator 36. The output signal of the modulator 31, representing the color signal at 7 megacycles, is applied to another input circuit of the modulator 36 to derive a color signal at 14 megacycles with frequency variations of the indexing signal in the output circuit of the modulator 36 for application to the windings 27, 27 to control the scanning velocity in conjunction with the output signal of the buffer 33. The phase and amplitude of the 14-megacycle color signal relative to the 7-megacycle signal applied to the windings 27, 27 may be suitably controlled by phase and gain adjustments of units 35 and 36.

Considering now the conjoint operation of the oscillator 34, the buffer 50, and the auxiliary line-scan windings 27, 27, the oscillator 34 applies its output signal to the cathode-ray tube 22 where the scanning velocity variations would cause the derived indexing-signal amplitude to fall below a given minimum level over regions of the cathode-ray tube face in the absence of correction. That is, the component of the indexing signal derived at electrode 24 due to the indexing-signal cathode-ray beam would not remain constant. This component determines the minimum amplitude of the indexing signal which exists when the picture-signal beam is cut off during black portions of the picture.

In accordance with the invention, to maintain the indexing signal above a given minimum amplitude level, the auxiliary line-scan windings 27, 27 develop a voltage signal from the current signal from modulator 36 and buffer 33 which is the derivative of the current signal. The current signal is representative of displacement variations of the cathode-ray beam. Thus, since the voltage signal derived by the windings 27, 27 represents the derivative of the current signal, the voltage signal is representative of the scanning velocity variations. Accordingly, the buffer 50 varies the bias of the indexing-signal gun inversely of the scanning velocity variations to increase the intensity of the indexing-signal cathode-ray beam during intervals when the beam is moving rapidly over the indexing strips and to decrease its intensity when the beam is moving slowly over the indexing strips.

In the manner described above, the indexing-signal amplitude is maintained above a predetermined minimum level because the component of the indexing signal at electrode 24 due to the indexing-signal cathode-ray beam is maintained substantially constant. Additionally, a substantially white raster is developed due to the indexing-signal beam because the intensity variations of the indexing-signal beam compensate for the velocity variations as the beam sweeps across the phosphor stripes.

Because the color signal does not modulate the intensity of the cathode-ray beam, color-signal interference at fundamental frequency is minimized. Thus, for some applications it may be desirable to eliminate the oscillator 34 and derive the indexing signal at a fundamental frequency of 7 megacycles. This will require modifying the translation frequency of amplifier 29 to 7 megacycles and the provision of suitable connection between the input circuit of multiplier 35 and the output circuit of amplifier 29 in lieu of connection between units 35 and 30. To maintain the indexing-signal amplitude above a given minimum level, the windings 27, 27 may then be coupled to the indexing gun of the tube 22 through a suitable network in lieu of buffer 50.

Moreover, it will be apparent that while the Fig. 1 system provides synchronization between the color element scanning frequency and the color-repetition frequency of the applied picture signals by controlling the color-repetition frequency of the picture signals, the invention is also applicable to systems which provide synchronization by controlling the color element scanning frequency by, for example, controlling the instantaneous sweep slope of the output signal of the line-scan generator.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-image-reproducing apparatus for a color-television receiver comprising: circuit means for supplying a picture signal representative of a color image to be reproduced; cathode-ray image-reproducing means having a display screen comprising color elements and including indexing means for developing an indexing signal representative of the scanning of said color elements by the cathode-ray beam; circuit means coupled to said cathode-ray image-reproducing means for effecting scanning of said color elements by said cathode-ray beam and responsive to said indexing signal for controlling the relation of the scanning of said color elements and the color repetition of said picture signal and responsive to said picture signal for varying the scanning velocity in accordance with the image to be reproduced to develop a color image; and circuit means responsive to said picture signal for modulating an indexing signal component of said cathode-ray beam inversely of the scanning velocity variations to maintain said indexing signal above a given minimum amplitude level.

2. Color-image-reproducing apparatus for a color-television receiver comprising: circuit means for supplying a color signal representative of the color of a color image to be reproduced; cathode-ray image-reproducing means having a display screen comprising color elements and including indexing means for developing an indexing signal representative of the scanning of said color elements by the cathode-ray beam; circuit means coupled to said cathode-ray image-reproducing means for effecting scanning of said color elements by said cathode-ray beam and responsive to said indexing signal for controlling the relation of the scanning of said color elements and the color repetition of said color signal and responsive to said color signal for varying the scanning velocity in accordance with the color of the image to be reproduced to develop a color image; and circuit means responsive to said color signal for modulating an indexing signal component of said cathode-ray beam inversely of the scanning velocity variations to maintain said indexing signal above a given minimum amplitude level.

3. Color-image-reproducing apparatus for a color-television receiver comprising: circuit means for supplying a signal representative of the luminance of a color image to be reproduced; circuit means for supplying a color signal representative of the color of a color image to be reproduced; cathode-ray image-reproducing means responsive to said luminance signal and having a display screen comprising color elements and including indexing means for developing an indexing signal representative of the scanning of said color elements by the cathode-ray beam; circuit means coupled to said cathode-ray image-reproducing means for effecting scanning of said color elements by said cathode-ray beam and responsive to said indexing signal for controlling the relation of the scanning of said color elements and the color repetition of said color signal and responsive to said color signal for varying the scanning velocity in accordance with the color of the image to be reproduced to develop a color image; and circuit means coupled to said supply circuit means for applying to said image-reproducing means a signal derived from said color signal and having a phase and amplitude representative of the scanning velocity variations for modulating the intensity of an indexing signal component of said cathode-ray beam inversely of said scanning velocity variations to maintain said indexing signal above a given amplitude level.

4. Color-image-reproducing apparatus for a color-television receiver comprising: circuit means for supplying a signal representative of the luminance of a color image to be reproduced; circuit means for supplying a color signal representative of the color of a color image to be reproduced; cathode-ray image-reproducing means having an electron gun responsive to said luminance signal for developing a picture-signal cathode-ray beam intensity-modulated by said luminance signal and an electron gun for developing an indexing-signal cathode-ray beam and having a display screen comprising color elements and including indexing means for developing an indexing signal representative of the scanning of said color elements by the cathode-ray beams; circuit means coupled to said cathode-ray image-reproducing means for effecting scanning of said color elements by said cathode-ray beams and responsive to said indexing signal for controlling the relation of the scanning of said color elements and the color repetition of said color signal and responsive to said color signal for varying the scanning velocity in accordance with the color of the image to be reproduced to develop a color image; and circuit means responsive to said color signal for deriving a signal representative of the derivative of the color signal which causes displacements of said cathode-ray beams for modulating said indexing-signal cathode-ray beam inversely of the scanning velocity variations to maintain said indexing signal above a given minimum amplitude level and to maintain a substantially white raster due to said indexing-signal cathode-ray beam.

5. Color-image-reproducing apparatus for a color-television receiver comprising: circuit means for supplying a picture signal representative of a color image to be reproduced; cathode-ray image-reproducing means having a display screen comprising color elements and including indexing means for developing an indexing signal representative of the scanning of said color elements by the cathode-ray beam; circuit means coupled to said cathode-ray image-reproducing means for effecting scanning of said color elements by said cathode-ray beam and responsive to said indexing signal for controlling the relation of the scanning of said color elements and the color repetition of said picture signal and responsive to said picture signal for varying the scanning velocity in accordance with the image to be reproduced to develop a color image; signal-generating circuit means coupled to said cathode-ray image-reproducing means for supplying an indexing-signal carrier for modulating said cathode-ray beam; and circuit means coupled to said supply circuit means and responsive to at least the fundamental component of said picture signal for deriving a signal inversely representative of the scanning velocity variations and coupled to the cathode-ray image-reproducing means for modulating an indexing signal component of said cathode-ray beam inversely of the scanning velocity variations to maintain said indexing signal above a given minimum amplitude level.

References Cited in the file of this patent

UNITED STATES PATENTS

| | | |
|---|---|---|
| 2,227,630 | Carnahan | Jan. 7, 1941 |
| 2,671,129 | Moore | Mar. 2, 1954 |
| 2,723,306 | Creamer | Nov. 8, 1955 |